United States Patent [19]

Fukuyama

[11] Patent Number: 5,110,893
[45] Date of Patent: May 5, 1992

[54] PREPARATION AND POLYMERIZATION OF CYCLIC AROMATIC KETONES

[75] Inventor: James M. Fukuyama, Clifton Park, N.Y.

[73] Assignee: General Electric Company, Schenectady, N.Y.

[21] Appl. No.: 559,920

[22] Filed: Jul. 30, 1990

Related U.S. Application Data

[63] Continuation-in-part of Ser. No. 146,154, Jan. 20, 1988, Pat. No. 4,980,453.

[51] Int. Cl.$^5$ .................. C08G 8/02; C08G 14/00; C08G 63/00; C08G 75/00
[52] U.S. Cl. ........................ 528/125; 528/126; 528/128; 528/174; 528/190; 528/195; 528/219; 528/220
[58] Field of Search ............... 528/125, 126, 128, 174, 528/219, 220, 190, 195

[56] References Cited

U.S. PATENT DOCUMENTS

| | | | |
|---|---|---|---|
| 3,271,463 | 9/1966 | Howard | 568/710 |
| 3,725,070 | 4/1973 | Hamb et al. | 528/195 |
| 4,299,948 | 11/1981 | Weiraugh et al. | 528/171 |
| 4,644,053 | 2/1987 | Brunelle et al. | 528/371 |
| 4,696,998 | 9/1987 | Brunelle et al. | 528/272 |
| 4,727,134 | 2/1988 | Brunelle et al. | 528/371 |
| 4,736,016 | 4/1988 | Brunelle et al. | 528/370 |
| 4,757,132 | 7/1988 | Brunelle et al. | 528/357 |
| 4,837,298 | 6/1989 | Cella et al. | 528/352 |
| 4,959,454 | 9/1990 | Fukuyama | 528/352 |
| 4,980,453 | 12/1990 | Brunelle et al. | 528/352 |

FOREIGN PATENT DOCUMENTS 0317226  5/1989  European Pat. Off. .

OTHER PUBLICATIONS

Jacobson et al., "Intramolecular Reaction in Polycondensations", pp. 1600–1606, Journal Chem. Physics., vol. 18, No. 12, 1950.
Semlyen, "Ring–Chain Equilibria & the Conformation of Polymer Chains", pp. 41–75, Jan. 1976.
Mandolini, "Intramolecular Reactions of Chain Molecules", Advances in Physical Org. Chem., vol. 22, 1986, pp. 3–111.
Cella et al., "The Preparation of Novel Cyclic Oligomers", J. Chem. Soc., Aug. 1989, pp. 581–582.
Mandolini et al., "Ring Closure Reactions of Bifunctional Chain Molecules", Am. Chem. Soc., vol. 14, No. 4, Apr. 1981, pp. 95–102.
Fastriz, "Cyclization Versus Polymerization in Polycondensation Reactions Under Continuous Addition of Two Symmetrical Monomers," pp. 419–422, Tetrahedron Letters, vol. 28, No. 4.
Winnik, "Cyclization & the Conformation of Hydrocarbon Chains", pp. 491–524, Chem. Rev., 1981, vol. 81.
Colquhoun et al., "Synthesis, Structure & Ring-Opening Polymerization of Strained Macrocyclic Biaryls", J. Chem. Soc., 1990.
Cella et al., "Ring–Open. Polymerization of Cyclic Ether & Thioether Imides, and Sulfones Via Ether–Ether Exchange," pp. 142–143.

*Primary Examiner*—Nathan M. Nutter
*Assistant Examiner*—P. Hampton-Hightower
*Attorney, Agent, or Firm*—William H. Pittman; James C. Davis, Jr.

[57] ABSTRACT

A composition and method of making macrocyclic aryl ether ketones useful in the preparation of high molecular weight resins. Macrocyclic aryl ether ketone compositions having structural units of the formula $$-(O-\underset{}{\bigcirc}-\underset{O}{\overset{\|}{C}}-\underset{}{\bigcirc}-A)_n$$

wherein n is an integer from about 2 to about 20, are prepared by contacting a dihalo compound of the formula $$X-\underset{}{\bigcirc}-\underset{O}{\overset{\|}{C}}-\underset{}{\bigcirc}-X$$

wherein X is a halogen with a compound of the formula

HO—A—OH in the presence of a dipolar aprotic solvent and a base, wherein A is a bridged biphenyl group selected from the group including formulas $$-A^1-Y-A^2- \text{ and} \qquad (I)$$

(structure with $CH_3$ groups, $(R^1)_m$ substituents)

wherein each $A^1$ and $A^2$ is a single ring divalent aromatic radical, Y is a bridging radical in which one or two atoms separate from $A^2$, $R^1$ is independently $C_{1-4}$ primary of secondary alkyl or halo, and $n_1$ is 0 to about 3.

19 Claims, No Drawings

PREPARATION AND POLYMERIZATION OF CYCLIC AROMATIC KETONES

This application is a continuation-in-part of copending application Ser. No. 07/146,154 filed Jan. 20, 1988 now U.S. Pat. No. 4,980,453.

TECHNICAL FIELD

This invention relates to macrocyclic oligomers and particularly to macrocyclic aromatic ketones and their preparation.

BACKGROUND OF THE INVENTION

Polyarylether ketones are known in the art. However, they are often difficult to process due to their high viscosities even at elevated temperatures. The manufacture of composites, rotomolding, or resin transfer molding typically involve the transfer of a resinous material from a heated vessel into a mold. In order to facilitate the transfer of resin, the resinous material must be maintained at a relatively low viscosity. Cyclic oligomers, and specifically cyclic polyarylether ketones, having lower molecular weights would, as a result, have a lower viscosity.

Macrocyclic oligomer compositions are known in the art. U.S. Pat. No. 4,299,948 discloses high molecular weight (15,000 or above) cyclic polycarbonates which may be prepared from a bisphenol bischloroformate in the presence of triethylamine as a catalyst. However, this cyclic product is a final polymer which cannot conveniently be used as an intermediate for the production of linear polycarbonates because of its high viscosity.

U.S. Pat. Nos. 4,644,053 and 4,727,134 disclose cyclic polycarbonate oligomers which are capable of conversion to high molecular weight linear homo- and copolycarbonates under reactive processing conditions.

U.S. Pat. No. 4,757,132 discloses cyclic polyarylates of similar molecular structure, capable of being formed from a wide variety of organic dihydroxy compounds.

Therefore, the present invention provides in high yields a composition of macrocyclic aryl ether ketones having low viscosity and consequently the above mentioned processing advantages, readily convertible by relatively simple means to linear polymers having a wide range of applications.

SUMMARY

In one of its aspects the present invention provides a composition of macrocyclic aryl ether ketones having structural units of the formula

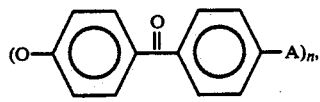

wherein n is an integer from about 2 to about 20, preferably about 2 to about 12, and A is a bridged bisphenol group. Suitable bisphenol groups include those of the formula

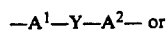

spirobiindane groups of the formula

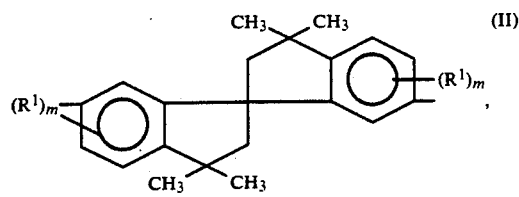

wherein $R^1$ is independently $C_{1-4}$ primary or secondary alkyl or halo, and m is 0 to about 3.

In another aspect of the present invention, there is provided a method of making a macrocyclic aryl ether ketone having the above mentioned structural units. A dihalo compound (a) of the formula

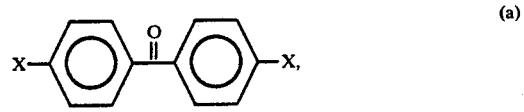

wherein X is a halogen, is contacted with (b) a compound
of the formula HO—A—OH in the presence of a dipolar aprotic solvent and a base.

DETAILED DESCRIPTION

In accordance with the present invention each of $A^1$ and $A^2$ is a single-ring divalent aromatic radical and Y is a bridging radical in which one or two atoms separate $A^1$ from $A^2$. The free valence bonds in formula I are usually in the meta or para positions of $A^1$ and $A^2$ in relation to R. Such values may be considered as being derived from bisphenols of the formula HO—$A^1$—Y—$A^2$—OH.

In formula I, the $A^1$ and $A^2$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1[-bicycloheptylmethylene, ethylene, isopropylidene, neopentylidene, cyclohexylidene, cyclopentadecylidene, cyclododecylidene or adamantylidene, especially a gem-alkylene radical. Also included are unsaturated radicals and radicals which are entirely or partially composed of atoms other than carbon and hydrogen. Examples of such radicals are 2,2-dichloroethylidene, carbonyl, thio, sulfone, and oxygen.

Suitable spirobiindane units mentioned above are derived from the 6,6'-dihydroxy-3,3,-3',3'-tetramethylspirobindanes (hereinafter "spirobiindane bisphenols"), which may be substituted or unsubstituted. These compounds may in turn be prepared by the sulfuric acid-catalyzed condensation of bisphenols of the formula

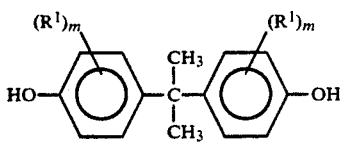

as disclosed, for example, in U.S. Pat. No. 3,271,463, incorporated herein by reference.

The $R^1$ values may be alkyl radicals such as methyl, ethyl, 1-propyl or 2-propyl, or halo atoms such as chloro or bromo. Among compounds containing such $R^1$ values, methyl and chloro are preferred; however, the most preferred compound is 6,6'-dihydroxy-3,3,3',3'-tetramethylspirobiindane, in which m is 0. This compound is frequently identified hereinafter as "SBI".

Further suitable A values can include for example units of the following formulas:

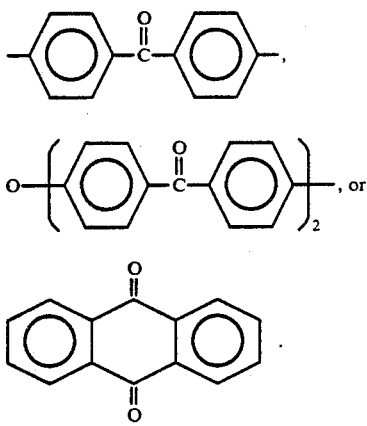

The macrocyclic polyetherketone oligomers of the present invention containing units of formula II may be prepared by the reaction of a spirobiindane bisphenol described hereinabove with a corresponding dihalo (preferably difluoro or dichloro) ketone in the presence of a basic reagent such as potassium carbonate or sodium carbonate, which promotes the requisite nucleophilic aromatic substitution reaction. A relatively high boiling dipolar aprotic solvent such as dimethyl sulfoxide or sulfolane is preferred, and suitable reaction temperatures are generally in the range of about 120° to about 180° C. Molar ratios of spirobiindane bisphenol to the dihalo compound (b) are generally 1:1, and the amount of base is often about 2.0 to about 2.5 moles per mole of spirobiindane bisphenol.

It is believed that compounds containing spirobiindane moieties have geometries that form macrocyclic oligomers in preference to linear polymers.

Other macrocyclic polyetherketones of the present invention may also be prepared by the reaction of a bisphenol compound of the formula HO—A—OH, wherein A is $A^1$—Y—$A^2$ described hereinabove, with a corresponding dihalo (preferably difluoro or dichloro) ketone utilizing pseudo high dilution conditions as defined in "Intramolecular Reactions of Chain Molecules" by Luigi Mandolini, 1986. Here the continuous addition of starting material to the already reacting system enables the concentration of the reactants to remain at low enough levels to permit cyclization. This reaction is also carried out in the presence of a basic reagent, preferably potassium carbonate or sodium carbonate, and a relatively high boiling dipolar aprotic solvent, such as dimethyl sulfoxide or sulfone. Suitable reaction temperatures range from about 120° to about 200° C. Although the reaction time is not critical, generally the reaction takes place from about 10 minutes to about 10 hours. The molar ratios of the compound (a) to the dihalo compound (b) are generally about 1:1, and the amount of base is often about 1 mole per mole of the dihalo compound (b).

The macrocyclic aryl ether ketone oligomer compositions of the present invention, possessing lower molecular weight and consequently lower viscosities than polyarylether ketones, have useful processing applications. The lower viscosity enhances resin flow and as a result fiber mats can be more thoroughly wetted in composite preparation as well as improving resin flow from heated vessels into a mold in processes such as resin transfer molding and rotomolding. Furthermore, the equilibration of these macrocyclic oligomers to high molecular weight materials liberate no volatiles, hence giving further processing advantages. The oligomers of the present invention may also be processed to form shaped articles, fibers or films.

In order that those skilled in the art may be better able to practice the present invention, the following examples are given as illustrations of the preparation of the macrocyclic oligomer compositions of the present invention. It should be noted that the invention is not limited to the specific details embodied in the Examples.

EXAMPLE 1

To a stirred mixture of 100 ml. of dimethyl sulfoxide, 50 ml. of toluene and 2.073 grams (20.9 mmol.) of postassium carbonate were added under nitrogen, 2.543 grams (10 mmol.) of 4,4'-difluorobenzophenone and 3.084 grams (10 mmol.) of SBI. The mixture was heated at about 140° to about 150° C. for 4 hours, cooled and poured into 400 ml. of methanol, whereupon the desired macrocyclic polyethersulfone oligomers precipitated as a white solid which was filtered and dried for 3 hours in a vacuum oven at 100° C. The yield was 47% of the theoretical yield.

EXAMPLES 2-3

The procedure of Example 1 was repeated, substituting other haloaryl compounds for the 4,4'-difluorobenzophenone. The compounds employed and yields of macrocyclic oligomers obtained were as follows:

Example 2-4-(4-fluorobenzoyl)phenyl ether, 40%;
Example 3-1,8-dichloro-9-10-anthroquinone, 52%.

EXAMPLE 4

This example illustrates a method for preparing the macrocyclic oligomers of the present invention using pseudo-high dilution conditions. A three neck 100 ml round bottom flask was equipped with a magnetic stirrer and an inlet for an inert atmosphere. The flask was also fitted with a Dean-Stark trap, condenser, thermometer and syringe needle inlet. The flask was charged with dimethyl sulfoxide (40 ml), toluene (20 ml) and potassium carbonate 0.864 grams, (6.25 mmol) and heated to 140° C. A sufficient amount of toluene was distilled off to maintain a pot temperature of 140 C. To the flask was added 4,4'-difluorobenzophenone (1.091 grams, 5.00 mmol) and bisphenol A (1.141 grams, 5.00 mmol), dissolved in DMSO (10 ml). Addition was controlled with a syringe pump and conducted over a 3 hour period. Following the addition period, the reaction was heated for a period of 5 hours, then cooled to room temperature. The reaction was poured into a blender containing methanol (200 mL) and the precipitated material was vacuum filtered and vacuum oven dried (110° C.) for several hours. The solid was blended twice with water, filtered and dried in a vacuum oven at 110° C. overnight. The yield was 1.845 grams of material (91% of theoretical).

Obviously, other modifications and variations of the present invention, are possible in light of the above teachings. It is therefore to be understood that changes may be made in particular embodiments of the invention described which are within the full intended scope of the invention as defined by the claims.

What is claimed is:

1. A composition comprising macrocyclic aryl ether ketones having the formula

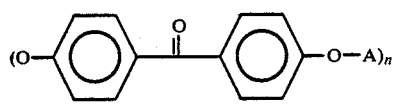

wherein n is an integer from about 2 to about 20 and A is a bridged biphenyl group selected from the group consisting of formulas $$-A^1-Y-A^2-, \text{ and} \quad (I)$$

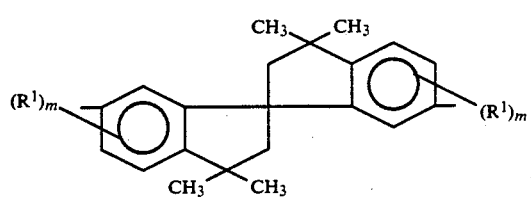

wherein each $A^1$ and $A^2$ is a single ring divalent aromatic radical, Y is a bridging radical in which one or two atoms separate $A^1$ from $A^2$, $R^1$ is independently $C_{1-4}$ primary or secondary alkyl or halo, and m is 0 to about 3.

2. A composition according to claim 1 wherein each $A^1$ and $A^2$ is p-phenylene and Y is selected from the group consisting of carbonyl, thio, sulfone, oxygen and isopropylidene.

3. A composition according to claim 1 wherein each of $A^1$ and $A^2$ is p-phenylene and Y is isopropylidene.

4. A composition according to claim 1 wherein A is a unit of formula II and m is zero.

5. A composition according to claim 1 wherein A is

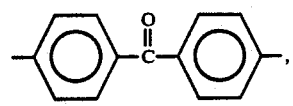

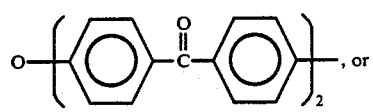

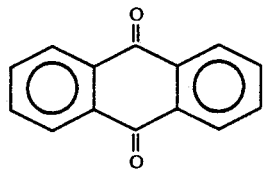

6. A method for preparing cyclic aryl ether ketone compositions consisting essentially of structural units of the following formula:

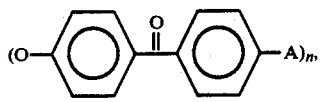

wherein n is an integer from about 2 to about 20, comprising contacting under reactive conditions (a) a dihalo compound of the following formula

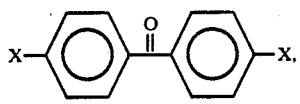

wherein X is a halogen, with (b) a compound of the formula

HO—A—OH in the presence of a dipolar aprotic solvent and a base, wherein A is a bridged biphenyl group selected from the group consisting of $$-A^1-Y-A^2-, \text{ and} \quad (I)$$

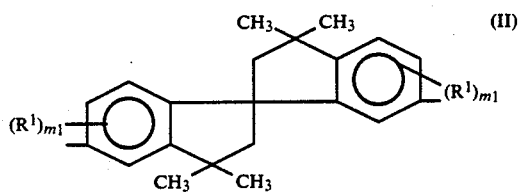

wherein each $A^1$ and $A^2$ is a single ring divalent aromatic radical, Y is a bridging radical in which one or two atoms separate $A^1$ from $A^2$, $R^1$ is independently $C_{1-4}$ primary or secondary alkyl or halo, and m is 0 to about 3.

7. A method according to claim 6 wherein each $A^1$ and $A^2$ is p-phenylene and Y is selected from the group consisting of carbonyl, thio, sulfone, oxygen and isopropylidene.

8. The method of claim 6 wherein each $A^1$ and $A^2$ is p-phenylene and Y is isopropylidene.

9. The method of claim 6 wherein A is a unit of formula II and m is zero.

10. The method of claim 6 wherein n is an integer from about 2 to about 12.

11. The method of claim 6 wherein the base is selected from the group consisting of $K_2CO_3$ and $Na_2CO_3$.

12. The method of claim 6 wherein the amount of base is about 1 mole per 1 mole of the compound (b).

13. The method of claim 6 wherein the amount of base is about 2.0 to about 1.5 moles per 1 mole of the compound of formula (II).

14. The method of claim 6 wherein the dipolar aprotic solvent is dimethyl sulfoxide or sulfolane.

15. The method of claim 6 wherein the reaction temperature is about 120° C. to about 200° C.

16. The method of claim 6 wherein the reaction time is about 10 minutes to about 10 hours.

17. The method of claim 6 wherein the molar ratio of the compound (b) to the compound (a) is about 1:1.

18. The method of claim 6 wherein the molar ratio of the compound of formula II to the dihalo compound (a) is about 1:1.

19. A shaped article, fiber or film comprising the composition of claim 1.

* * * * *